United States Patent [19]
Masuda et al.

[11] Patent Number: 5,450,931
[45] Date of Patent: Sep. 19, 1995

[54] VIBRATION CONTROL APPARATUS

[75] Inventors: Hiromitsu Masuda, Ibaraki; Taichi Sato, Ishioka; Kihachiro Tanaka, Ushiku; Yukiko Ikeda, Ibaraki, all of Japan

[73] Assignee: Hitachi, Ltd., Tokyo, Japan

[21] Appl. No.: 216,718

[22] Filed: Mar. 23, 1994

[30] Foreign Application Priority Data

Jun. 24, 1993 [JP] Japan ................... 5-153257

[51] Int. Cl.⁶ .................................... F16F 9/30
[52] U.S. Cl. .................. 188/268; 188/378; 188/322.5; 267/136
[58] Field of Search ............ 188/268, 322.5, 378–380, 188/322.19, 322.21, 267, 313, 314, 298; 267/136, 64.13, 140.11–140.13, 140.14, 152; 252/74; 192/21.5; 74/474

[56] References Cited

U.S. PATENT DOCUMENTS

| | | | |
|---|---|---|---|
| 2,732,040 | 1/1956 | De Vost et al. | 188/268 |
| 2,830,833 | 4/1958 | Alldredge et al. | 188/322.5 |
| 3,134,585 | 5/1964 | Trask | 188/268 X |
| 3,251,076 | 5/1966 | Burke | 188/268 X |
| 3,417,660 | 12/1968 | Harbrecht | 188/268 X |
| 3,494,607 | 2/1970 | Rusch | 188/268 X |
| 3,503,600 | 3/1970 | Rich | 188/322.5 X |
| 3,610,604 | 10/1971 | Terai | 188/268 |
| 3,648,983 | 3/1972 | Campbell | 188/268 |
| 3,747,914 | 7/1973 | Thrasher | 267/140.13 X |
| 3,874,646 | 4/1975 | Vernier | 267/140.13 |
| 4,121,812 | 10/1978 | Dousset | 267/152 X |
| 4,471,538 | 9/1984 | Pomeranz et al. | 188/322.5 X |
| 4,504,044 | 3/1985 | Shtarkman | 267/140.13 X |
| 4,576,366 | 3/1986 | Gallas et al. | 188/268 X |
| 4,738,339 | 4/1988 | Taylor | 188/322.19 |
| 4,772,407 | 9/1988 | Carlson | 188/268 |
| 4,856,626 | 8/1989 | Nakanishi | 188/268 X |
| 4,981,286 | 1/1991 | Kato et al. | 267/140.14 |
| 5,284,330 | 2/1994 | Carlson et al. | 188/267 X |

FOREIGN PATENT DOCUMENTS

| | | | |
|---|---|---|---|
| 1813849 | 7/1970 | Germany . | |
| 2302657 | 8/1973 | Germany . | |
| 2324402 | 11/1973 | Germany . | |
| 2701181 | 7/1978 | Germany . | |
| 2916381 | 11/1979 | Germany . | |
| 3002948 | 7/1981 | Germany . | |
| 3234469 | 3/1984 | Germany . | |
| 3602641 | 7/1987 | Germany . | |
| 53-13070 | 6/1978 | Japan . | |
| 62-165041 | 7/1987 | Japan | 188/268 |
| 2172373 | 9/1986 | United Kingdom . | |
| 1569461 | 6/1990 | U.S.S.R. . | |
| 1578388 | 7/1990 | U.S.S.R. | 188/322.19 |

OTHER PUBLICATIONS

Patent Abstracts of Japan, vol. 3, No. 148 (M-83) 7 Dec. 1979 & JP-A-54 125 370 (Mitsubishi Denki) 28 Sep. 1979.

Patent Abstracts of Japan, vol. 14, No. 347 (M-1002) (4290) 26 Jul. 1990 & JP-A-02 120 537 (Showa) 8 May 1990.

*Primary Examiner*—Douglas C. Butler
*Attorney, Agent, or Firm*—Antonelli, Terry, Stout & Kraus

[57] ABSTRACT

A thixotropic material is charged in a container. The container also holds a movable member which is placed in the thixotropic material so as to stir the thixotropic material. A force transmitting element is connected to the movable member. When an object, the vibration of which is to be controlled, is out of resonance, the amplitude of vibration is so small that the thixotropic material is in a gel state, thus presenting a comparatively large spring constant for the vibration control apparatus. As the excitation frequency is increased towards the resonance range, the amplitude of vibration is increased correspondingly, so that the movable member stirs the thixotropic material to generate stress in the latter, whereby the phase of the thixotropic material is changed from gel to sol. Consequently, the natural frequency of the vibration system, including the object and the vibration control apparatus, is lowered, thus averting resonance. It is thus possible to obtain vibration restraining or control effect over a wide range of excitation frequencies.

14 Claims, 12 Drawing Sheets

VIBRATION CONTROL APPARATUS

FIELD OF THE INVENTION AND RELATED ART STATEMENT

The present invention relates to a vibration control apparatus for restraining vibration.

A vibration control apparatus of the aforementioned type is disclosed in JP-A-53-13070 wherein a container has a thixotropic material contained in the container. The term "thixotropic material" is used in this specification to mean a material which normally does not exhibit fluidity and is in gel state with elasticity but is changed into a non-elastic sol state exhibiting fluidity under energy such as of vibration, and resumes the original gel state when the vibration is extinguished.

This known vibration control apparatus damps vibration as the energy of vibration is absorbed by the phase transformation from gel state into sol state of the thixotropic material. In other words, this vibration control apparatus produces the vibration damping effect only in the transition period in which the phase is changed from gel to sol. Thus, no appreciable vibration damping effect is obtained when the phase transformation has been completed, i.e., when the whole thixotropic material has been transformed from gel into sol. This type of vibration control apparatus, therefore, cannot suitably be used under conditions where vibration is applied continuously for a certain period of time.

Known vibration control apparatus also suffers from a problem in that, when the frequency of externally applied vibration progressively increases, as in the case of start up and acceleration of a rotary machine, to a rated speed, the vibration control apparatus undesirably resonates to produce vibration of greater amplitudes, as well as noise, when the vibration frequency coincides with the natural frequency of the vibration control apparatus itself or of the system including the vibration control apparatus.

OBJECT AND SUMMARY OF THE INVENTION

Accordingly, an object of the present invention is to provide a vibration control apparatus which can overcome the above-described problems of the prior art.

To this end, according to the present invention, there is provided a vibration control apparatus comprising: a container; a thixotropic material contained in the container; a movable member disposed in the thixotropic material; and a force transmitting member attached to the movable member.

DESCRIPTION OF THE PREFERRED EMBODIMENTS

Figure 1:
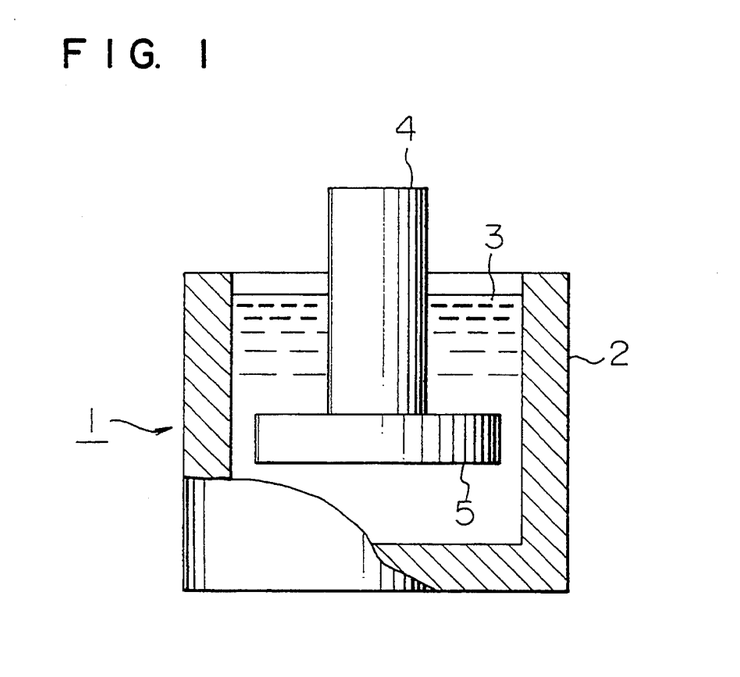
FIG. 1 is a partly-sectioned front elevational view of an embodiment of a vibration control apparatus in accordance with the present invention.

Referring to FIG. 1, an embodiment of the vibration control apparatus of the invention, generally designated by the reference numeral 1, has a container 2 and a thixotropic material 3 contained in the container 2. A force transmitting element 4 is extended into the thixotropic material 3. The force transmitting element 4 is connected to a movable member 5 which is placed in the thixotropic material 3. The container 2 is made of a material having a certain level of stiffness such as stainless steel.

Figure 2:
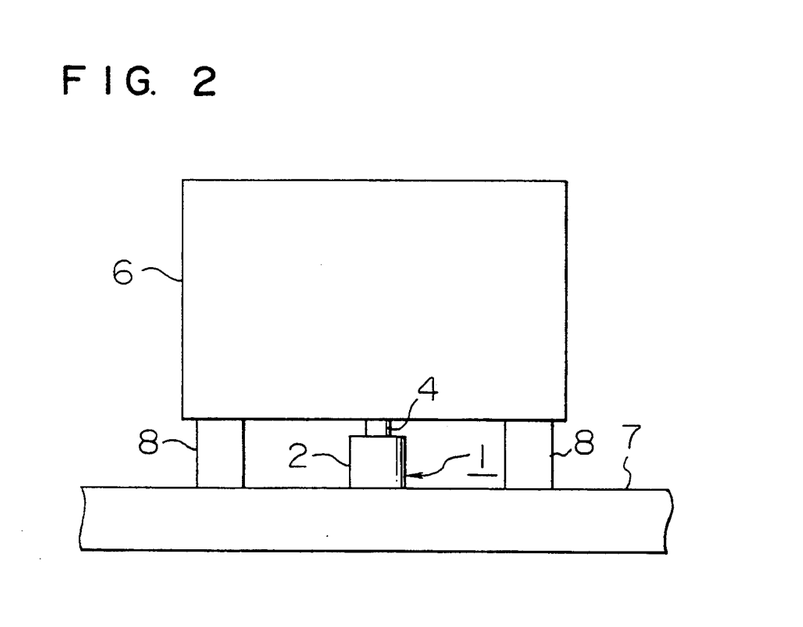
FIG. 2 is a front elevational view of a system in which the vibration control apparatus shown in FIG. 1 is applied to an object the vibration of which is to be controlled.

As shown in FIG. 2, an object 6, the vibration of which is to be controlled, is mounted on a base 7 through elastic members 8. The vibration control apparatus 1 shown in FIG. 1 is provided between the base 7 and the object 6. More specifically, the container 2 of the vibration control apparatus 1 is fixed to the base 7, while the force transmission element 4 is connected to the object 6. The object 6 contains a rotary machine as an excitation source.

This arrangement forms a vibration system in which the object 6 serves as a mass, while the elastic members 8 and the vibration control apparatus 1 serve as spring and damper elements. The vibration characteristics of the object 6 are therefore determined according to the mass of the object 6, and the spring constant and the damping coefficient of the elastic members 8 and the vibration control apparatus 1.

The behavior of the vibration system will be described with specific reference to FIG. 3 which graphically depicts the vibration characteristics of the object 6, with the abscissa representing excitation frequency and the ordinate representing an amplitude magnification factor.

Figure 3:
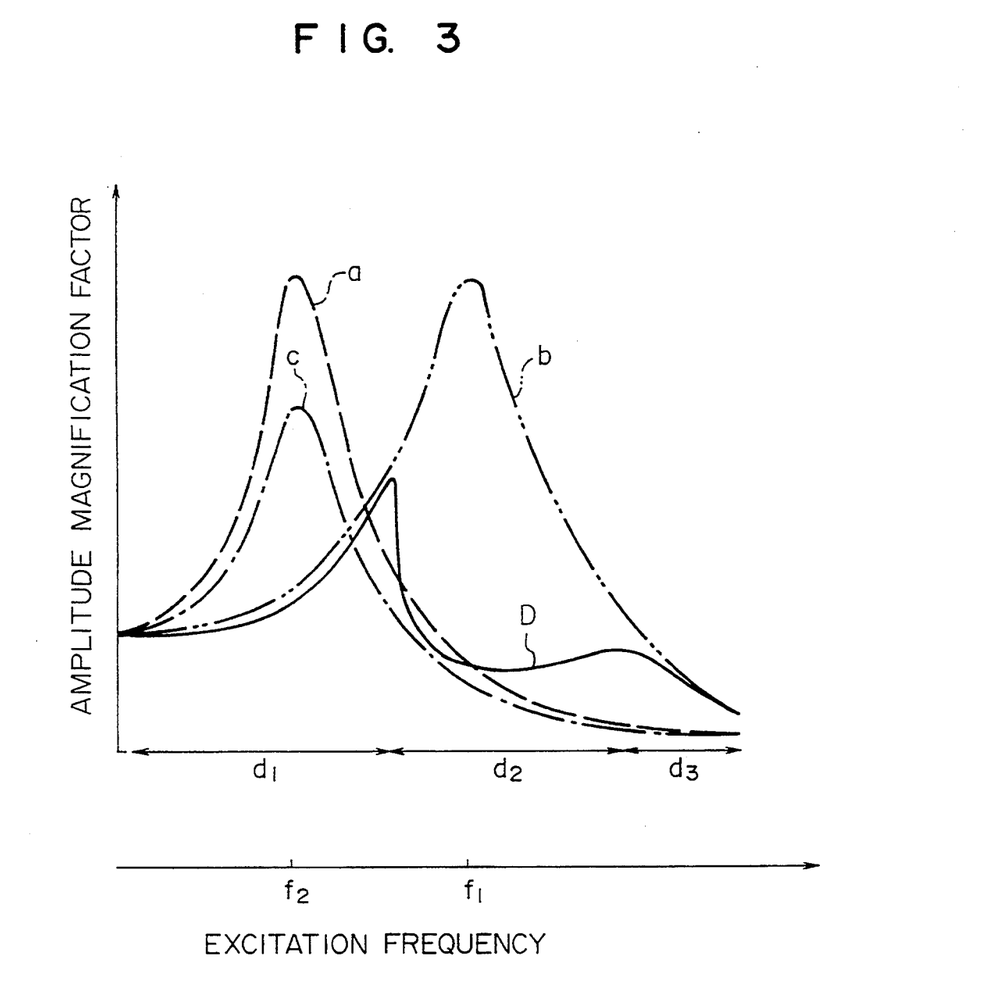
FIG. 3 is a graphical illustration of vibration characteristics as observed in the application shown in FIG. 2.

Referring to FIG. 3, a curve a shows the vibration characteristics of the object 6 as observed when the vibration control apparatus of the invention is not used. Curves b and c show the vibration characteristics of the object 6 as observed when the vibration control apparatus of the invention is used. More specifically, the curve b shows the vibration characteristics as observed when the thixotropic material 3 continues to be in gel state, while the curve c shows the vibration characteristics observed when the thixotropic material 3 is kept in sol state, respectively.

It will be seen that the vibration characteristics of the object 6 vary according to the state of the thixotropic material 3. This is because the factors which determine the vibration characteristics, i.e., the spring constant and the damping coefficient of the vibration control apparatus 1, vary according to the phase of the thixotropic material 3. More specifically, when the thixotropic material 3 is in gel state, the natural frequency $f_1$ is high because the thixotropic material 3 has elasticity.

In contrast, when the thixotropic material 3 is in sol state, the natural frequency, designated at $f_2$, is as low as that obtained when the vibration control apparatus 1 is not used, because the thixotropic material 3 in sol state does not exhibit any elasticity. Furthermore, damping effect is enhanced due to fluidity of the thixotropic material 3.

The thixotropic material 3 in the vibration control apparatus 1 is in gel state when the rotary machine is started up, so that the amplitude magnification factor increases along the curve b as the machine is accelerated to increase the excitation frequency. The excitation force is transmitted through the force transmitting element 4 to the movable member 5 of the vibration control apparatus 1, causing it to vibrate. Since the movable member is immersed in the thixotropic material 3, the vibrating movable member 5 stirs the thixotropic material 3. Accordingly, the thixotropic material 3 is changed from gel to sol, that is, gel-sol change takes place, so that the thixotropic material 3 looses its elasticity.

Consequently, the spring constant of the vibration control apparatus 1 is reduced and the vibration characteristic of the object 6 varies along the curve c. After that, the vibration of the object 6 is reduced despite a further increase in the excitation frequency. Consequently, the phase of the thixotropic material 3 is changed again from sol to gel, causing the vibration characteristics to follow the curve b of FIG. 3. Namely, the amplitude magnification factor of the object 6 varies along a curve D, in the course of the rise of the excitation frequency.

When the excitation frequency is within the range indicated by $d_1$, the state of the thixotropic material 3 is in gel state, and the vibration frequency varies along the curve b. In contrast, when the excitation frequency is within the range $d_2$, the thixotropic material 3 is changed from gel to sol, so that the vibration characteristics follow the curve c. In the excitation frequency range $d_3$, the vibration is reduced, so that the thixotropic material 3 changes its state from sol to gel, thus causing the vibration characteristics to follow the curve b again.

As will be understood from the foregoing description, when the vibration condition approaches the resonance condition, i.e., when the excitation frequency approaches the apparent natural frequency $f_1$, the thixotropic material changes its state from gel to sol so as to vary the spring constant of the vibration control apparatus 1. Consequently, the apparent natural frequency of the object 6 is changed from $f_1$ to $f_2$, thus making it possible to avoids resonance and, hence, to avoid dangerous increase in the vibration amplitude. The described effect is obtainable not only in starting up a rotary machine but also in various other cases where excitation frequency varies due to change in the rotation speed as in the case of a speed control of a motor.

Examples of the materials suitably used as thixotropic material 3 employed in the invention are a gel of aluminum hydroxide, a suspension such as bentonite, a paint formed by dispersing pigment particles in a dry oil, a grease prepared by dispersing aluminum in a lubricating oil, castor oil derivative and low-molecule polyethylene derivative.

The thixotropic material should be selected to match with the vibration characteristics (curve D) peculiar to the object 6 of the vibration control.

The components which contact the thixotropic material 3, such as the container 2, force transmitting element 4 and the movable member 5 are preferably made of materials which are not degraded by contact with the thixotropic material. For instance, when the thixotropic material 3 is an aqueous colloidal solution, these components are preferably made of a material resistant to water, such as stainless steel, plastics or the like.

Figure 4:
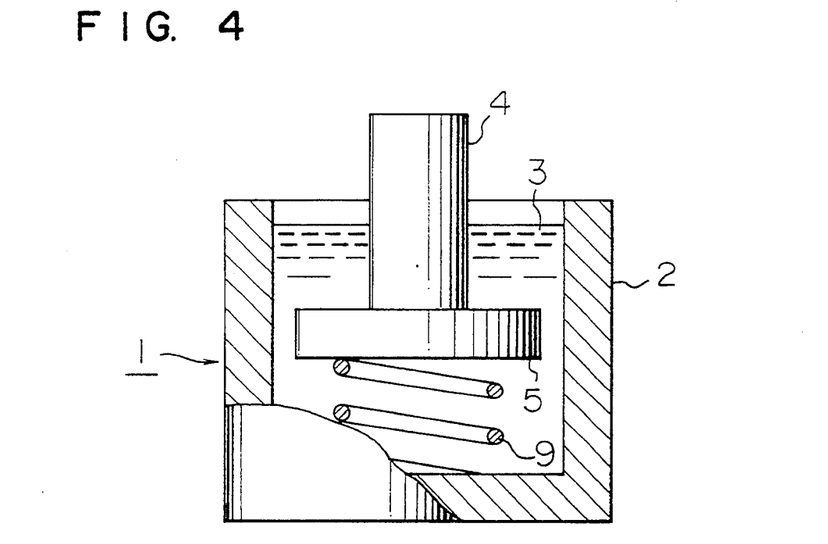
FIG. 4 is a partly-sectioned front elevational view of another embodiment of the vibration control apparatus in accordance with the present invention.

FIG. 4 illustrates another embodiment of the vibration control apparatus in which a movable member 5 is supported by an elastic member 9 which also is immersed in the thixotropic material 3.

The embodiment of FIG. 4 offers, in addition to the advantages brought about by the embodiment of FIGS. 1 and 2, an additional advantage in that the object 6 to be vibration-controlled is supported by the vibration control apparatus 1 alone, without the aid of the elastic members 8 used in the preceding embodiment. Furthermore, the elastic member 9, which also is immersed or embedded in the thixotropic material 3, stirs the thixotropic material 3 in cooperation with the movable member 5, so that the gel-sol change takes place over a larger volume to produce a large damping effect.

Figure 5:
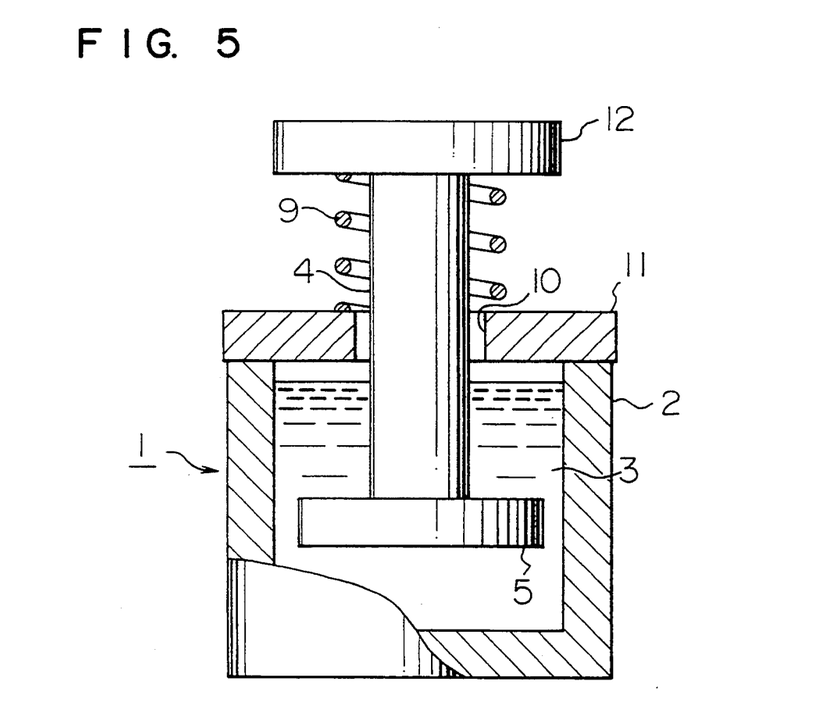
FIG. 5 is a partly-sectioned front elevational view of still another embodiment of the vibration control apparatus in accordance with the present invention.

FIG. 5 shows still another embodiment in which the container 2 is made of a stainless steel and has a cylindrical form, with a lid 11 having a through-hole 10 through which the force transmitting element 4 is extended into the cavity inside the container 2. A stirring member 5 is attached to one end of the force transmitting member 4 received in the container 2, while an object mount 12 for mounting the object 6 is attached to the other end of the element 4. An elastic member, i.e., a spring 9, is loaded between the object mount 12 and the lid 11.

The embodiment of FIG. 5 controls the vibration of the object 6 as in the preceding embodiments. In addition, the embodiment of FIG. 5 makes it possible to support the object 6 by the vibration control apparatus 1 alone, without using elastic members 8.

A description will be given of the vibration characteristics of the vibration control apparatus shown in FIG. 5, with specific reference to FIG. 20.

The embodiment shown in FIG. 5 employs a bentonite suspension as the thixotropic material, while a stainless steel plate having a through-hole is used as the stirring element 5.

An experiment was conducted by using the vibration control apparatus of the embodiment of FIG. 5 to mount an aluminum block as the object 6 to be vibration controlled. The container 2 of the vibration control apparatus was excited by an excitation device mounted thereon. Vibration transmissibility was determined by measuring the accelerations of the movable part of the excitation device and the object 6. The excitation frequency was continuously changed from 5 Hz to 60 Hz.

Figure 20:
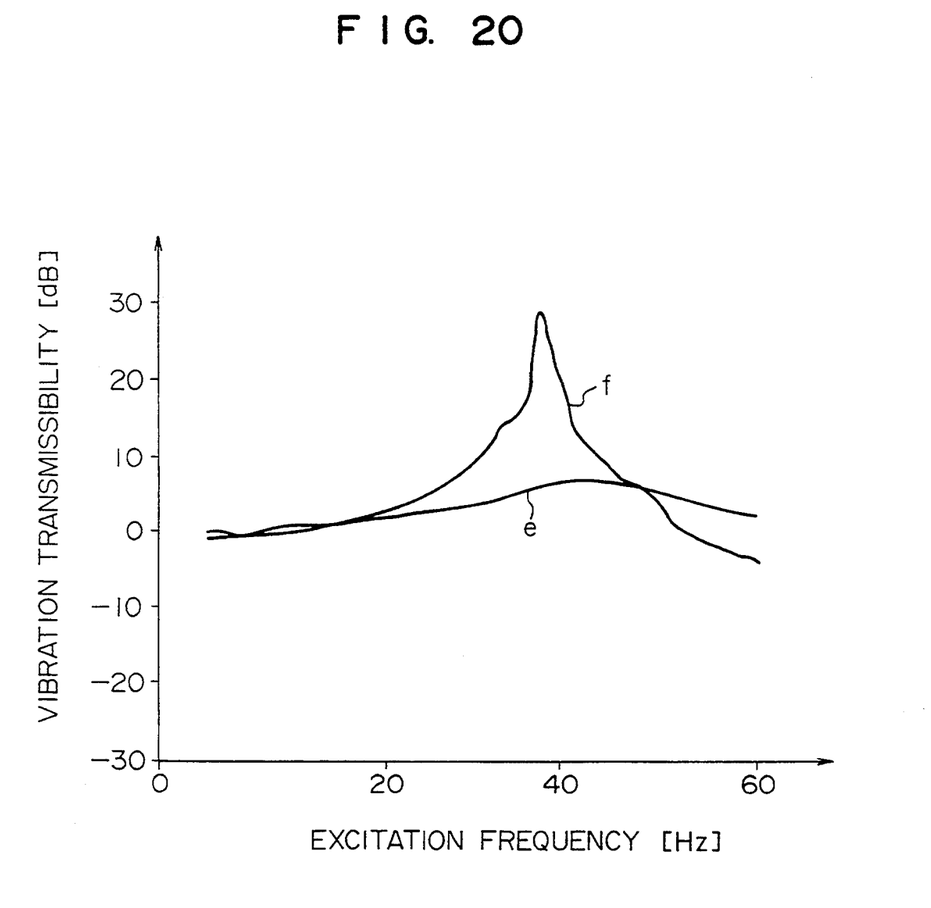
FIG. 20 is a graphical illustration of vibration characteristics illustrative of the result of an experiment conducted on a vibration control apparatus of the present invention.

The result of the experiment is shown in FIG. 20 wherein the abscissa indicates excitation frequency while the ordinate indicates vibration transmissibility. A curve e in FIG. 20 shows the vibration transmission characteristics as observed when the vibration control apparatus of the present invention is used. By way of comparative example, a curve f shows the vibration transmission characteristics obtained when the object is supported by a single elastic member.

As will be seen from FIG. 20, the vibration control apparatus of the invention exhibits reduction of the vibration transmissibility which is as large as 23.6 dB at the greatest, as compared with the case where the object is supported by a single elastic member. From the above-described experimental result, it is understood that the vibration control apparatus of the described embodiment produces a remarkable vibration damping effect.

In each of the embodiments described hereinbefore, the container containing therein the thixotropic material may contain ball-shaped members for stirring the thixotropic material 3 effectively.

Figure 6:
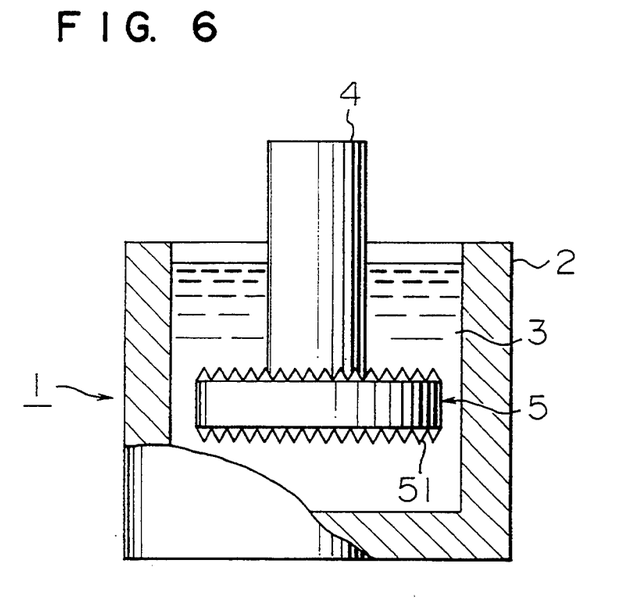
FIG. 6 is a partly-sectioned front elevational view of a further embodiment of the vibration control apparatus in accordance with the present invention.

FIG. 6 shows a further embodiment which features a multiplicity of projections 51 formed on the surfaces of a tabular movable member 5.

The gel-sol change of the thixotropic material 3 occurs in response to the shearing force applied to the thixotropic material 3. In the embodiment shown in FIG. 6, it is possible to trigger the phase change of the thixotropic material 3 with comparatively small vibration, by virtue of the projections 51 which can apply a larger shearing force to the thixotropic material as compared with the movable member 5 without projections. Furthermore, the projections 51 provided on the movable member 5 produce drag when the movable member 5 vibrates in the thixotropic material 3 which has been changed from gel to sol. Consequently, a large damping effect is produced to restrain vibration. The magnitude of the force applied by the movable member 5 to the thixotropic material 3 can be changed by varying the size of the movable member 5, so that the spring constant of the vibration system can freely be determined. Furthermore, it is possible to change the vibration amplitude at which the gel-sol change occurs by varying the shapes and number of the projections 51.

Figure 7:
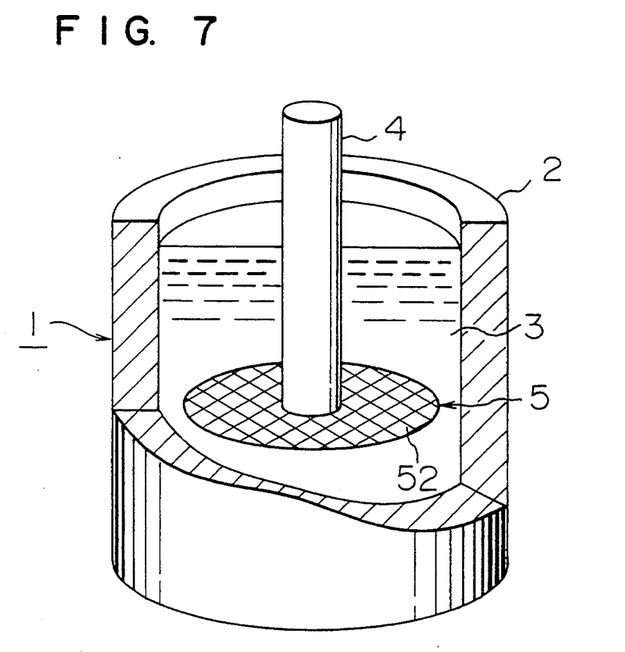
FIG. 7 is a partly-sectioned perspective view of a still further embodiment of the vibration control apparatus in accordance with the present invention.

A still further embodiment shown in FIG. 7 features a movable member 5 that has a net-like portion 52. According to this arrangement, the movable member 5 is capable of applying a larger shearing force to the thixotropic material 3 and can move through the thixotropic material 3 in sol state without being substantially resisted by the thixotropic material 3. It is therefore possible to effect the gel-sol change of the thixotropic material 3 with a small amplitude of vibration. It is also possible to determine the vibration amplitude at which the gel-sol change occurs, as well as the spring constant of the vibration system, by suitably determining the fineness of the mesh of the net-like portion 52 and the size of the wires which forms the net-like portion.

Figure 8:
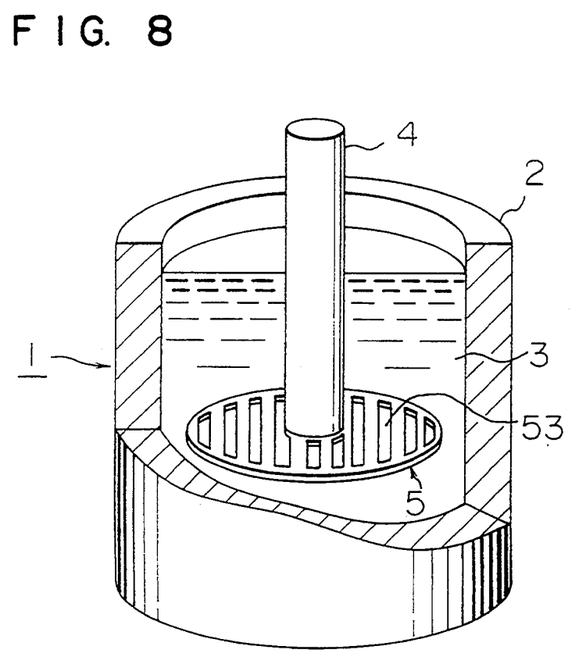
FIG. 8 is a partly-sectioned perspective view of a different embodiment of the vibration control apparatus in accordance with the present invention.

FIG. 8 illustrates a different embodiment in which at least one slit 53 is formed in the movable member 5.

With the arrangement of FIG. 8, the gel-sol change of the thixotropic material 3 can be realized with comparatively small amplitude of the vibration since a larger shearing force can be applied to the thixotropic material 3 by the vibration of the movable member 5. Furthermore, the vibration amplitude at which the gel-sol change of the thixotropic material 3 takes place, as well as the spring constant of the vibration system, can be varied by suitably determining the shape and size of the slits 53, which can change the amplitude of the shearing force applied to the thixotropic material.

Figure 9:
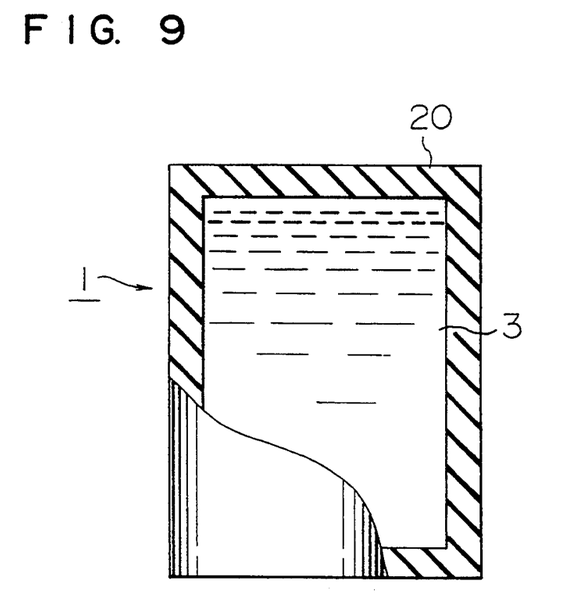
FIG. 9 is a partly-sectioned front elevational view of a different embodiment of the vibration control apparatus in accordance with the present invention.

FIG. 9 shows a different embodiment which has a container 20 made of an elastic material and a thixotropic material 3 in the cavity of the container 20. The material of the container may be, for example, rubber.

In the embodiment of FIG. 9, a vibration system is constituted by an object the vibration of which is to be controlled as a mass, and the vibration control apparatus as the spring and damping element. In this vibration system, the thixotropic material 3 is in the gel state when the vibration system is out of resonance to exhibit small vibration amplitude of the object, so that the vibration control apparatus shown in FIG. 9 exhibits a comparatively large spring constant. When the excitation frequency is increased to approach the resonance state, i.e., when the frequency approaches the apparent natural frequency, the amplitude of vibration of the object is increased. The vibration of the increased vibration amplitude is transmitted to the elastic container 20 to cause deformation thereof. This also causes a deformation of the thixotropic material 3 which is contained in the container 20, triggering the gel-sol change of the thixotropic material 3. Consequently, the spring constant of the vibration control apparatus 1 is reduced to lower its natural frequency, whereby the resonance of the object is averted and dangerous increase in the vibration amplitude is avoided.

In the embodiment of FIG. 9, the object to be vibration-controlled can be supported by the vibration control apparatus 1 alone, as in the cases of the embodiments explained before in connection with FIGS. 4 and 5. In addition, the embodiment of FIG. 9 offers an advantage in that the number of parts or components can be reduced to lower the production cost, as compared with the embodiments shown in FIGS. 4 and 5.

Figure 10:
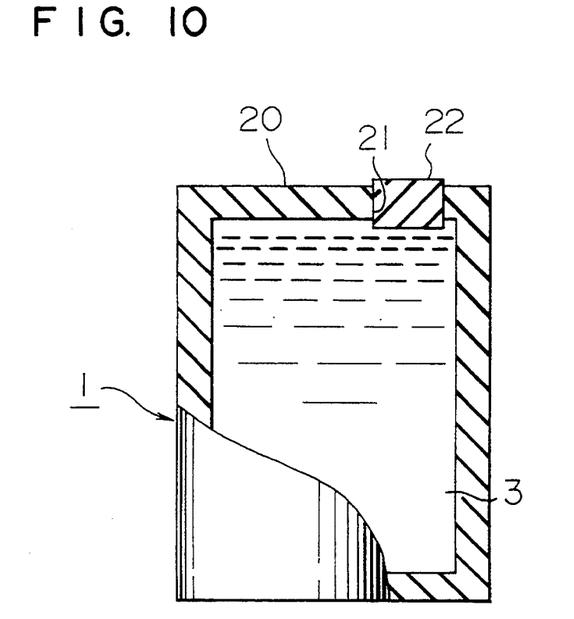
FIG. 10 is a partly-sectioned front elevational view of a different embodiment of the vibration control apparatus in accordance with the present invention.

FIG. 10 illustrates a different embodiment which has a container 20 made of an elastic material and having a through-hole 21 formed in a wall portion thereof. A thixotropic material 3 is charged into the container 20 through this hole 21 which is to be closed with a plug 22.

The embodiment of FIG. 10 offers, besides the advantages brought about by the preceding embodiments, additional advantages are obtained such as ease of manufacture. In addition, the plug 22, when designed as a detachable member, enables an easy manufacturing of this apparatus and renewal of the thixotropic material 3.

Figure 11:
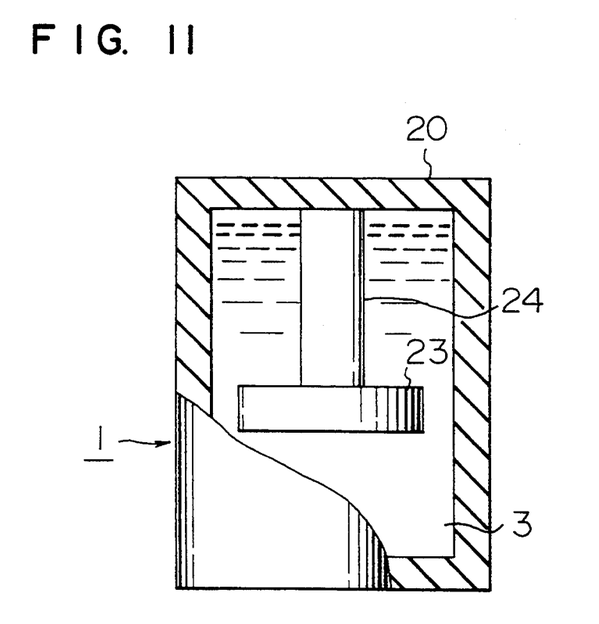
FIG. 11 is a partly-sectioned front elevational view of a different embodiment of the vibration control apparatus in accordance with the present invention.

FIG. 11 shows a different embodiment which also has a container 20 made of an elastic material and a thixotropic material 3 contained in the container 20. This embodiment further has a stirring element 23 which is secured to the wall of the container 20 through a support member 24.

In operation, the elastic container 20 deforms in accordance with the vibration of the object. At the same time, the stirring element 23 moves within the thixotropic material 3 relative to the latter. Consequently, the thixotropic material 3 is stirred to cause the gel-sol change by vibration of comparatively small amplitude. Once the gel-sol change takes place, such change proceeds very rapidly, thus quickly enabling prevention of resonance, and then controlling the vibration without delay.

Figure 12:
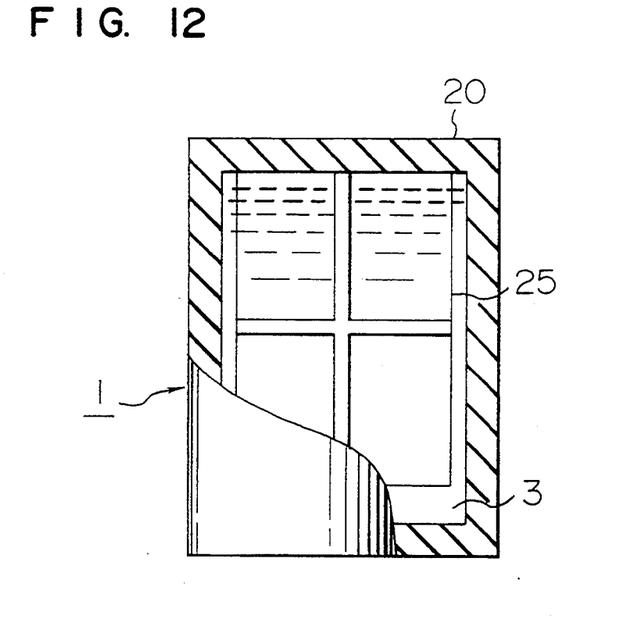
FIG. 12 is a partly-sectioned front elevational view of a different embodiment of the vibration control apparatus in accordance with the present invention.
Figure 13:
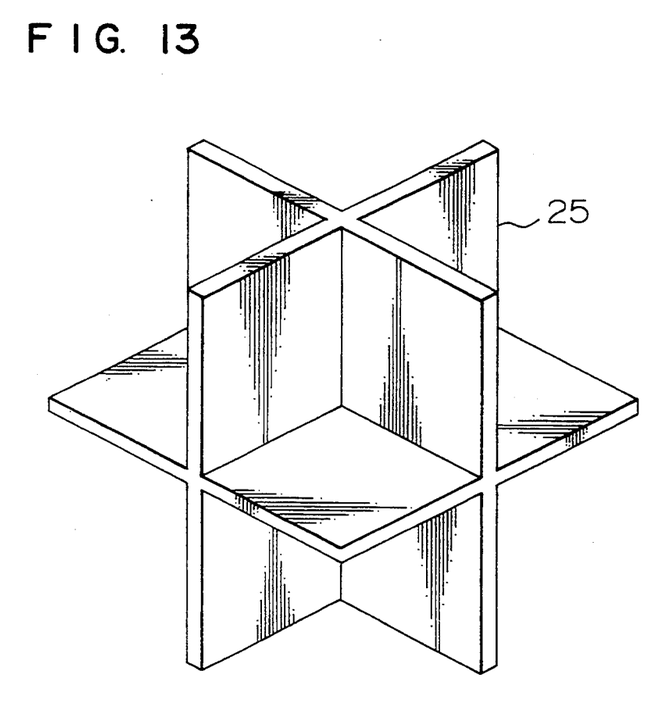
FIG. 13 is a perspective view of a composite stirring element used in the embodiment shown in FIG. 12.

FIG. 12 shows a different embodiment which features a composite stirring element 25 formed by combining a plurality of plates assembled together in a manner shown in FIG. 13. This composite stirring element 25 is directly secured to the elastic container 20.

In the embodiment of FIGS. 12 and 13, the thixotropic material 3 can be stirred omnidirectionally by the composite stirring element 25, so that vibration is controlled omnidirectionally.

Figure 14:
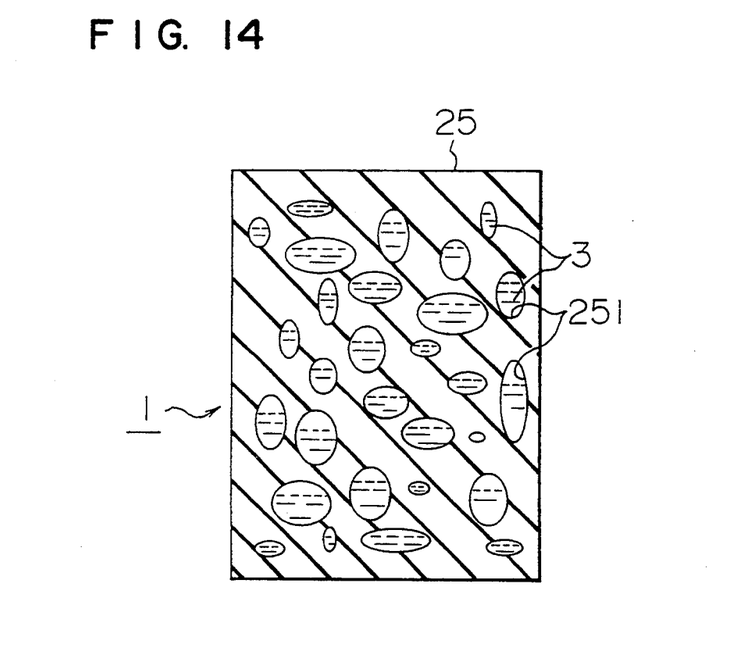
FIG. 14 is a vertical sectional view of a different embodiment of the vibration control apparatus in accordance with the present invention.

FIG. 14 illustrates a different embodiment which has a container 25 made of an elastic porous material. At least one of the pores 251 of the container 25 is charged with a thixotropic material 3.

It will be understood that in the embodiment of FIG. 14, the vibration control apparatus produces the same effect in controlling the vibration of an object carried by this vibration control apparatus.

Figure 15:
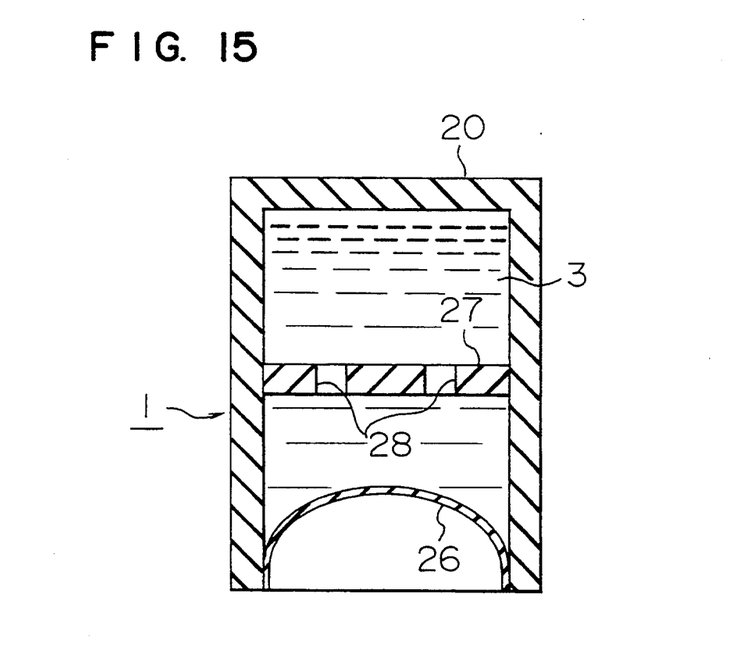
FIG. 15 is a vertical sectional view of a different embodiment of the vibration control apparatus in accordance with the present invention.

FIG. 15 shows a different embodiment which employs an elastic container 20 having a bottom wall constituted by a diaphragm 26. The interior space of the container 20 is divided into two chambers by a flow resistance member 27 having at least one through bore 28. The chambers are charged with a thixotropic material 3.

In operation, when the object is vibrated with a large amplitude, the container 20 is deformed by the vibration. Accordingly, any pressure is applied to the thixotropic material 3, and the flexible diaphragm 26 is deformed, so that the volume of the thixotropic material 3 can be maintained. At the same time, the thixotropic material 3 moves through the through bore 28 in the flow resistance member 27 from one chamber to the other. Consequently, a shearing force is applied to the thixotropic material 3, causing a rapid gel-sol change of the thixotropic material 3. After such change has occurred, the damping effect is given by the flow resistance. Consequently, the spring constant and the damping characteristics of the vibration control apparatus are changed so that any resonance is avoided, preventing generation of vibration of large amplitude.

Figure 16:
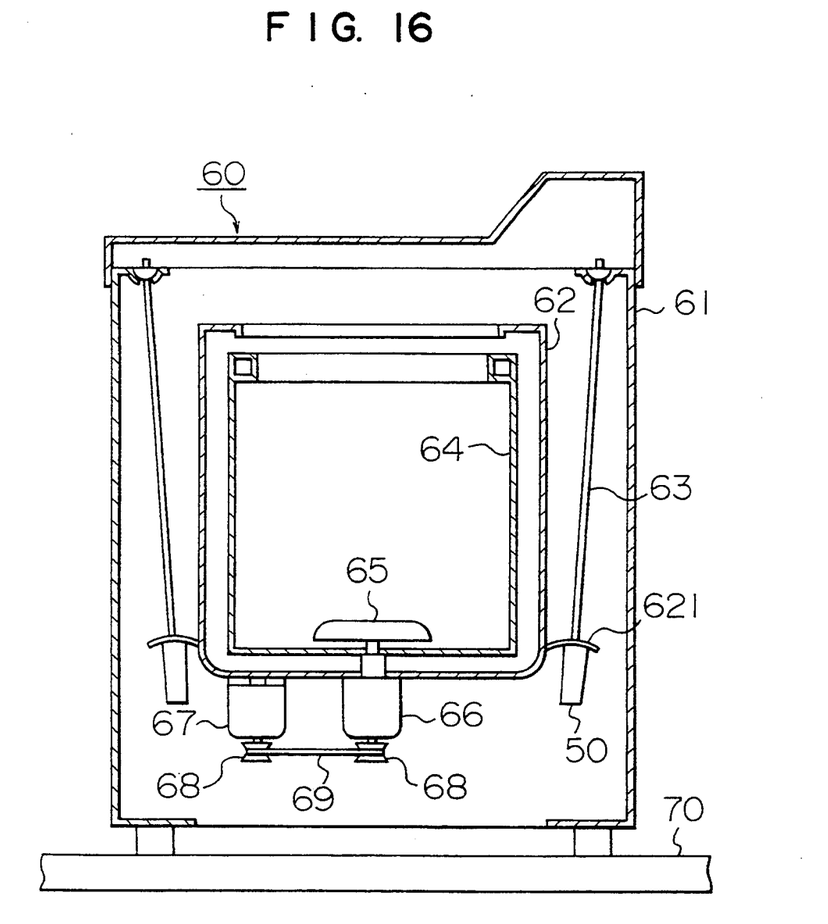
FIG. 16 is a vertical sectional view of a laundry machine incorporating a vibration control apparatus of the present invention.
Figure 17:
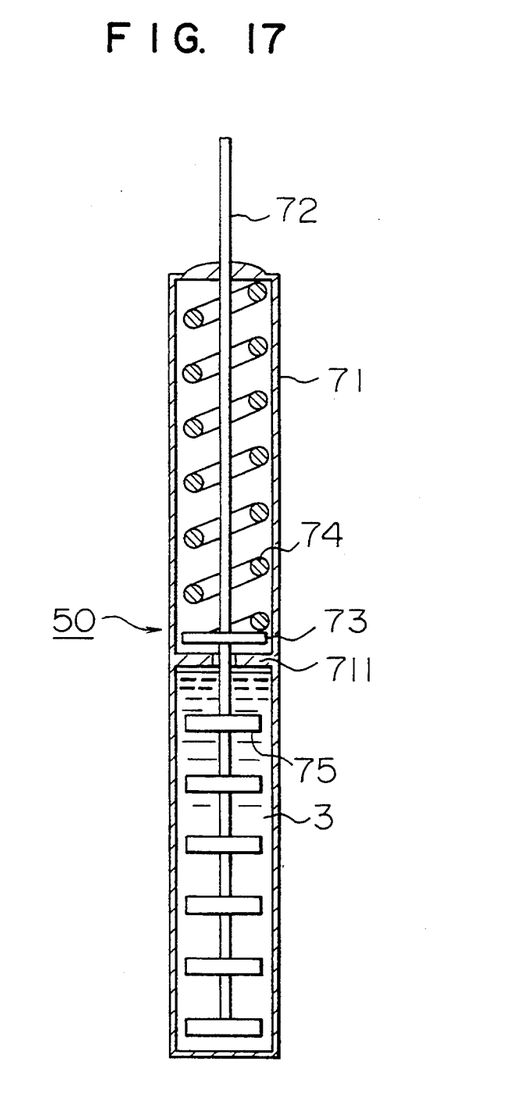
FIG. 17 is a vertical sectional view of an embodiment of the vibration control apparatus used in the laundry machine of FIG. 16.

FIG. 16 illustrates a laundry machine which incorporates a vibration control apparatus of the invention shown in FIG. 17. The laundry machine 60 has an outer frame 61 which accommodates an outer tank 62. The outer tank 62 is suspended from the outer frame 61 by means of suspension rods 63. The outer tank 62 receives an inner tank 64 coaxially therewith. A pulsator 65 is installed on the bottom of the inner tank 64. A clutch case 66, fixed to the outer tank 62, incorporates a change-over switch and a brake mechanism. In a washing operation, the change-over switch and the brake mechanism inside the clutch case 66 are suitably operated to make the inner tank 64 stationary, and a motor 67 is started to drive the pulsator 65. For the purpose of dehydration, the change-over switch is so changed over that the driving power from the motor 67 is transmitted to the inner tank 64 through a pulley 68 and a belt 69 to rotate the inner tank 64. The laundry machine 60 is mounted on the base 70.

A vibration control apparatus 50 is provided at the lower end of each suspension rods 63 at which the outer tank 62 is supported.

As shown in FIG. 17, the vibration control apparatus 50 has a cylindrical cover 71 and a connecting rod 72 which extends into the cover 71. The cover 71 supports the outer tank 62 by the flange 621, as shown in FIG. 16. The connecting rod 72 is connected to the suspension rod 63 shown in FIG. 16. A stopper 73 is provided on the connecting rod 72. The interior of the cover 71 is divided into two chambers by a partition wall 711. A coiled spring 74 is in a first chamber of the cover 71 so as to act between the stopper 73 and the top wall of the cover 71. A second chamber is charged with a thixotropic material 3. At least one disk member 75 is fixed to a portion of the connecting rod 72 received in the thixotropic material 3. The operation of the embodiment of FIGS. 16 and 17 is as follows.

In a dehydrating operation, the inner tank 64 vibrates together with the outer tank 62 due to mass imbalance caused by local concentration of the clothes. The vibration is transmitted to the outer frame 61 via the suspension rods 63 and further to the base 70.

When the vibration system composed of the outer tank 62 and the suspension rods 63 of the laundry machine 60 is out of resonance, and the amplitude of the vibration is small, the thixotropic material 3 contained in the vibration control apparatus suspended by the suspension rod 63 is in gel state.

When the vibration system reaches the resonance situation due to change in the excitation frequency as a result of, for example, change in the rotational speed of the motor 67, and then the amplitude becomes large, the vibration of the outer tank 62 is transmitted to the vibration control apparatus 50. As a result, the gel-sol change of the thixotropic material 3 takes place to reduce the spring constant of the vibration control apparatus 50. Consequently, the natural frequency of the entire vibration system is changed, whereby the resonance is avoided and the vibration is damped.

Figure 18:
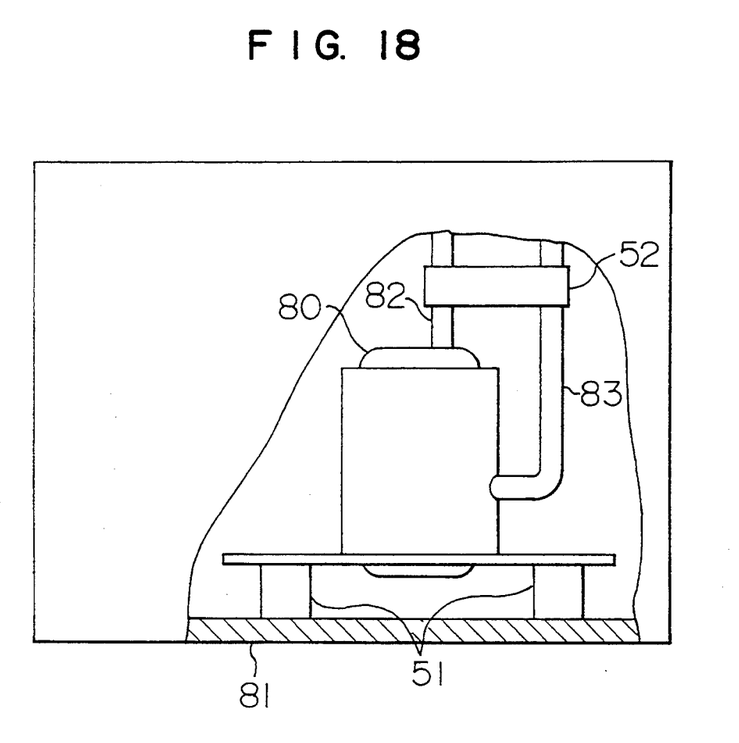
FIG. 18 is a partly-sectioned elevational view of an air-conditioner outdoor unit incorporating the vibration control apparatus of the present invention.

FIG. 18 illustrates a compressor of, for example, an air-conditioner, to which a vibration control apparatus of the present invention is applied. In order to prevent vibration from being transmitted from the compressor 80 to a casing 81, the compressor 80 is usually supported through very soft elastic rubber members. Therefore, the vibration system including the compressor has a low natural frequency so that resonance occurs in an early phase after start-up of the compressor until the rated speed is reached, thus allowing vibrations of large amplitude to be generated. Such vibrations of large amplitude causes large stress in a suction pipe 82 and a discharge pipe 83, causing a risk of breakdown of these pipes. When the rotating speed of the compressor 80 is varied by the controller, such as the inverter controller, the excitation frequency also varies, thus increasing the risk of occurrence of resonance. There also is a risk that resonance of the pipes 82, 83 takes place when the excitation frequency is changed.

A vibration control apparatus 51 embodying the present invention is disposed between the compressor 80 and the casing 81 as a supporting leg. When the entire vibration system including the compressor and the vibration control apparatus resonates, the spring constant of the vibration control apparatus is changed to vary the natural frequency thereof, whereby the resonation is averted. In order to achieve omnidirectional vibration restraining effect, the vibration control apparatus of the type explained before in connection with FIG. 12 is preferably used as the vibration control apparatus 51.

Figure 19:
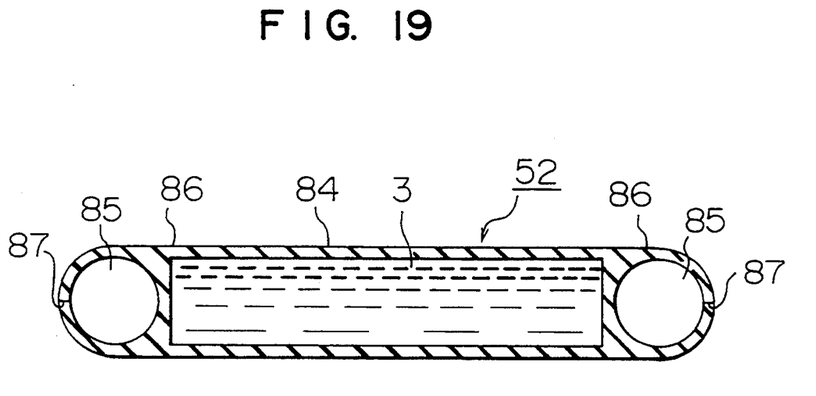
FIG. 19 is a cross-sectional view of an embodiment of the vibration control apparatus associated with a pipe of the air-conditioner outdoor unit shown in FIG. 18.

In order to avoid excessive vibration of the pipes 82 and 83, another vibration control apparatus 52 of the invention is disposed between the pipes 82 and 83. Referring to FIG. 19, the vibration control apparatus 52 has an elastic case 84 and a thixotropic material 3 charged in the case 84. The case 84 is provided on both ends thereof with connecting portions 86 each having a bore 85 for receiving the pipe 82 or 83. Each connecting portion 86 is provided with a slit 87. The connecting portion 86 can be applied to the pipes 82 and 83 by elastically spreading the slits 87. Thus, each pipe is elastically clamped by the connecting portion 86.

According to this arrangement, when either the pipe 82 or the pipe 83 resonates, the spring constant of the vibration control apparatus 52 is reduced to vary the natural frequency of the pipe 82 or 83, whereby the entire vibration system comes out of resonance. It is thus possible to control the vibration of the pipes.

It will be clear that the describe advantages are brought about also when the vibration control apparatus 52 is provided between the bends of the pipes 82 and 83 or between each of the pipes 82 and 83 and the casing 81.

What is claimed is:

1. An apparatus for controlling vibration of an object, said apparatus comprising:
    a container;
    a thixotropic material contained in said container;
    a movable member immersed in said thixotropic material within said container; and
    a force transmitting member having a first end attached to said movable member and a second end adapted for attachment to the object;
    said thixotropic material, said movable member, said force transmitting member, and the object constituting a vibration system having a first resonant frequency when said thixotropic material is in a gel state and a second resonant frequency, lower than the first resonant frequency, when said thixotropic material is in a sol state, said thixotropic material changing from the gel state to the sol state in response to vibration of the vibration system at an amplitude occurring at a vibration frequency between the first and second resonant frequencies.

2. A vibration control apparatus according to claim 1, further comprising an elastic member for resisting movement of said force transmitting member and being a further component of the vibration system.

3. A vibration control apparatus according to claim 2, wherein said elastic member is disposed between said container and said force transmitting member.

4. A vibration control apparatus according to claim 2, wherein said elastic member is disposed between said container and said movable member.

5. A vibration control apparatus according to one of claims 1 to 4, wherein said movable member is a tabular member having projections on the surfaces thereof.

6. A vibration control apparatus according to one of claims 1 to 4, wherein said movable member has a network-like structure.

7. A vibration control apparatus according to claim 1 or 4, wherein said movable member has at least one through bore.

8. An apparatus for controlling vibration of an object, said apparatus comprising:
    a thixotropic material; and
    an elastic container containing said thixotropic material, adapted for attachment to the object, and capable of transmitting deformation of said container to said thixotropic material,
    said thixotropic material, said container and the object constituting a vibration system having a first resonant frequency when said thixotropic material is in a gel state and a second resonant frequency, lower than the first resonant frequency, when said thixotropic material is in a sol state, said thixotropic material changing from the gel state to the sol state in response to vibration of the vibration system at an amplitude occurring at a vibration frequency between the first and second resonant frequencies.

9. A vibration control apparatus according to claim 8, further comprising a stirring element for stirring said thixotropic material and being a further component of the vibration system.

10. A vibration control apparatus according to claim 9, wherein said stirring element is formed of a plurality of tabular members.

11. A vibration control apparatus according to claim 8, wherein said container is made of a porous material, and said thixotropic material is charged in at least one of the pores of the container material.

12. A vibration control apparatus according to claim 8, wherein said container has a polyhedral shape with walls of different spring constant, and includes a flow resistance member fixed in said polyhedral container.

13. An apparatus for controlling vibration of a device incorporating an excitation source, said apparatus comprising:
    a device having an excitation source;
    a container;
    a thixotropic material contained in said container;
    a movable member immersed in said thixotropic material within said container; and
    a force transmitting element having a first end connected to said movable member and a second end connected to said device;
    said thixotropic material, said movable member, said force transmitting member, and said device constituting a vibration system having a first resonant frequency when said thixotropic material is in a gel state and a second resonant frequency, lower than the first resonant frequency, when said thixotropic material is in a sol state, said thixotropic material changing from the gel state to the sol state in response to vibration of the vibration system at an amplitude occurring at a vibration frequency between the first and second resonant frequencies.

14. A vibration control apparatus according to claim 13, wherein said device is a laundry machine or an air-conditioner.

* * * * *